United States Patent [19]

Goguel

[11] 4,147,130

[45] Apr. 3, 1979

[54] FISH BREEDING CAGE STRUCTURE

[76] Inventor: Olivier P. Goguel, 80 rue Michel-Ange, 75016 Paris, France

[21] Appl. No.: 778,262

[22] Filed: Mar. 16, 1977

[30] Foreign Application Priority Data

Mar. 25, 1976 [FR] France ............................. 76 08667

[51] Int. Cl.² .......................................... A01K 63/00
[52] U.S. Cl. ......................................... 119/3; 43/102
[58] Field of Search .................. 119/3, 5, 51 R; 43/7, 43/44.99, 102

[56] References Cited

U.S. PATENT DOCUMENTS

| 695,921 | 3/1902 | Forster | 43/44.99 |
| 3,905,143 | 9/1975 | Poirot | 43/7 |
| 4,013,042 | 3/1977 | Ingold | 119/3 |

Primary Examiner—Hugh R. Chamblee
Attorney, Agent, or Firm—Sherman Levy

[57] ABSTRACT

The cage structure comprises a cage having an opening in its upper side provided with a closing device. The latter only allows the passage of a feeding device which is movable along a guide device extending down from a float to inside the cage. A cable attached to the feeding device drives the feeding device along the guide device from the inside of the cage up to the float.

16 Claims, 9 Drawing Figures

U.S. Patent   Apr. 3, 1979   Sheet 1 of 3   4,147,130
FIG_1
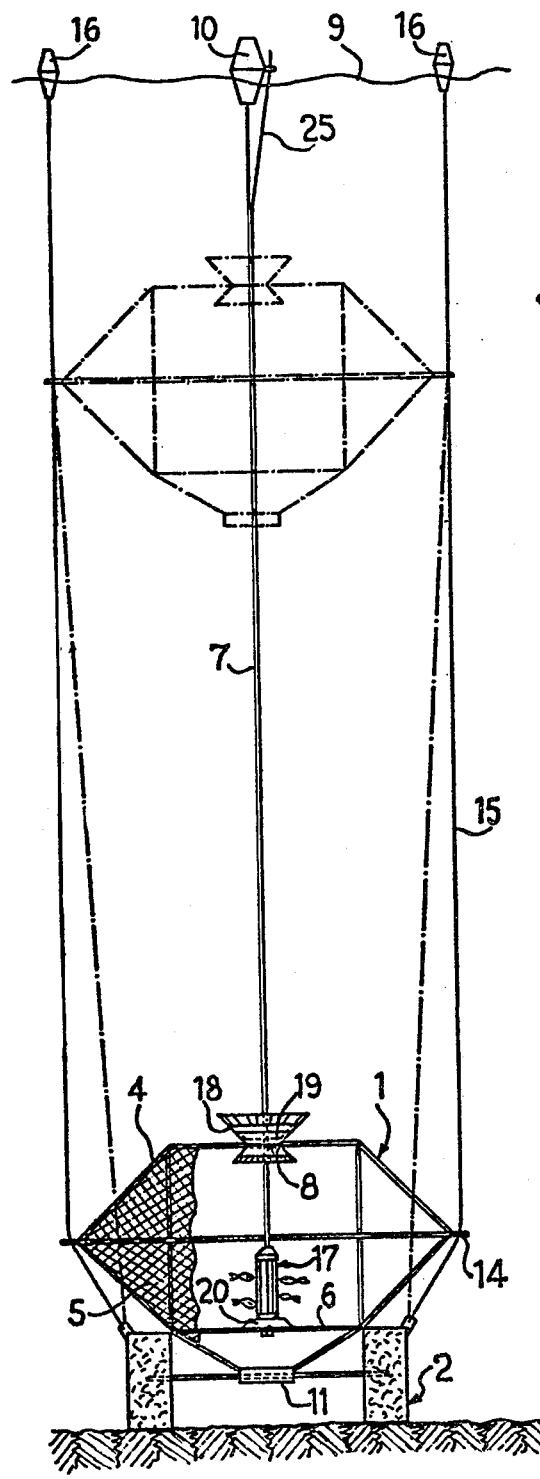
FIG_2
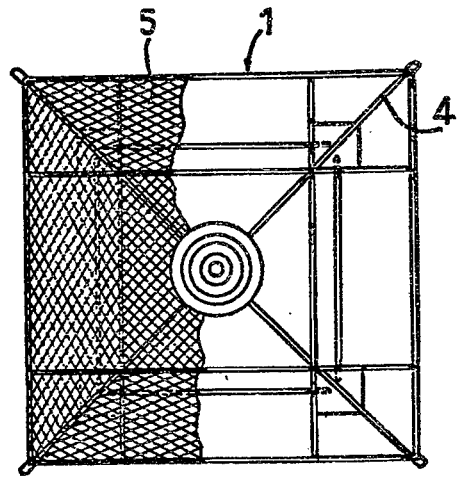
FIG_3
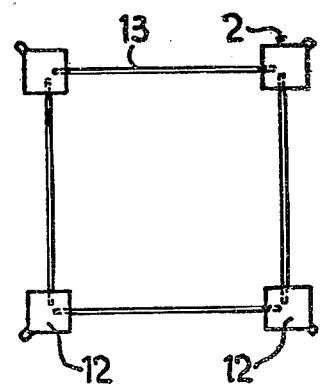

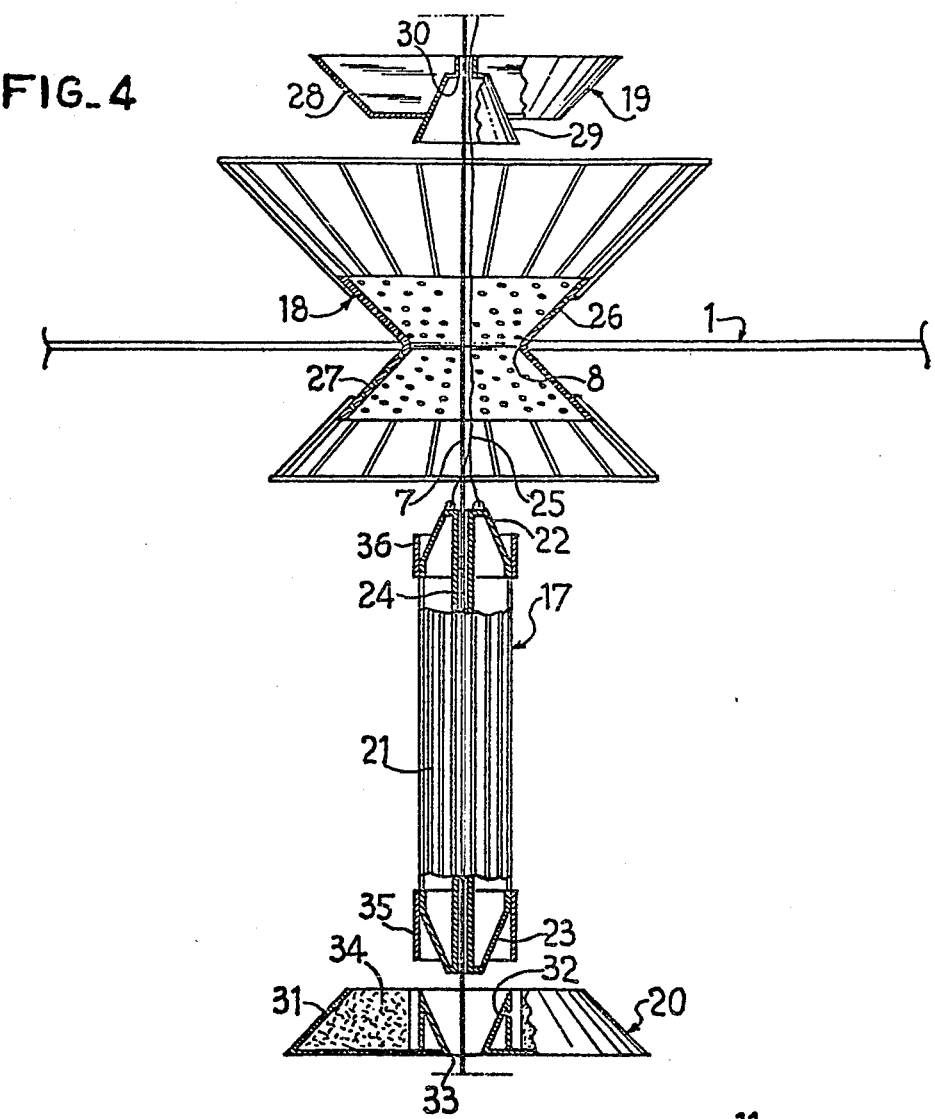
FIG_4
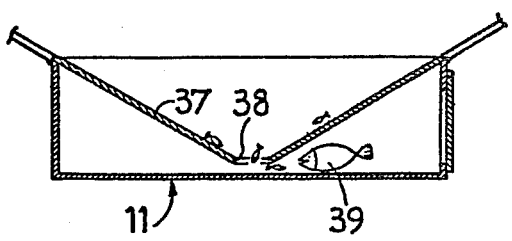
FIG_5
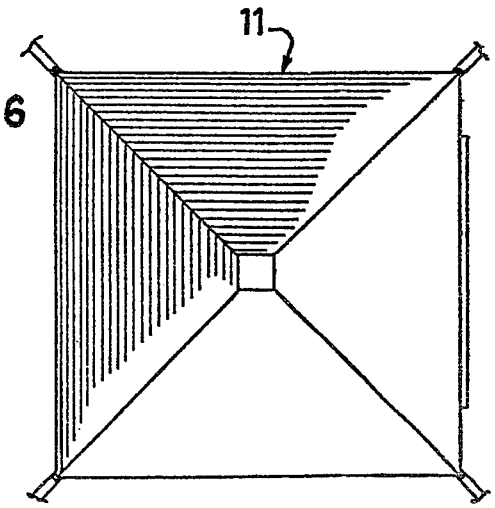
FIG_6

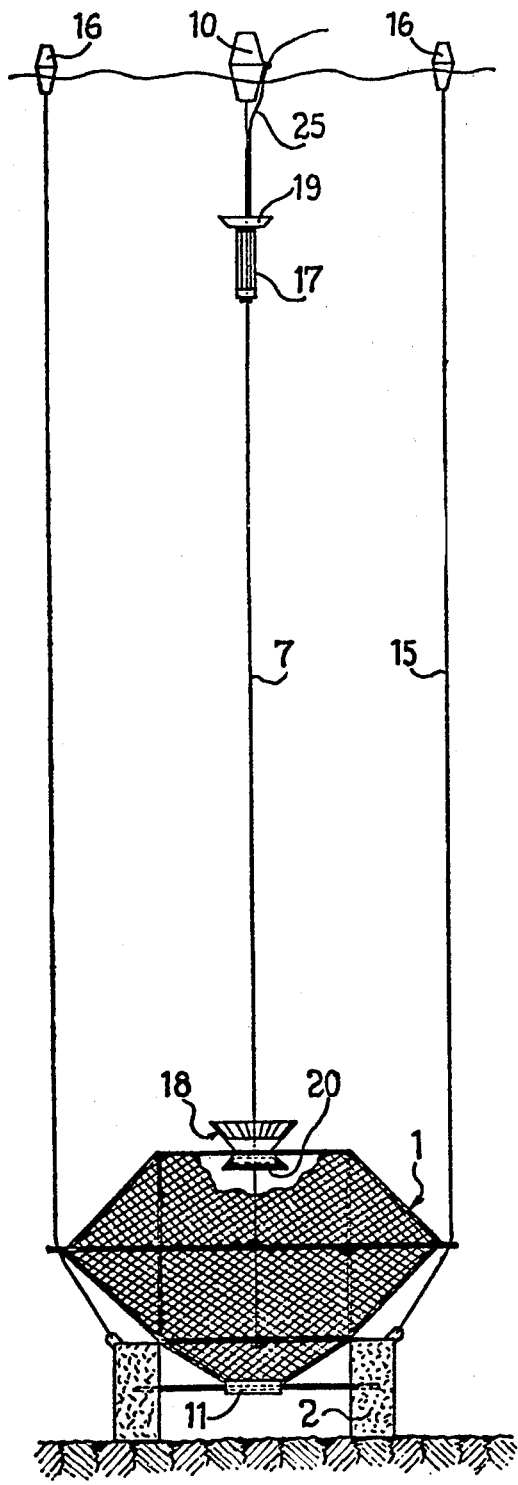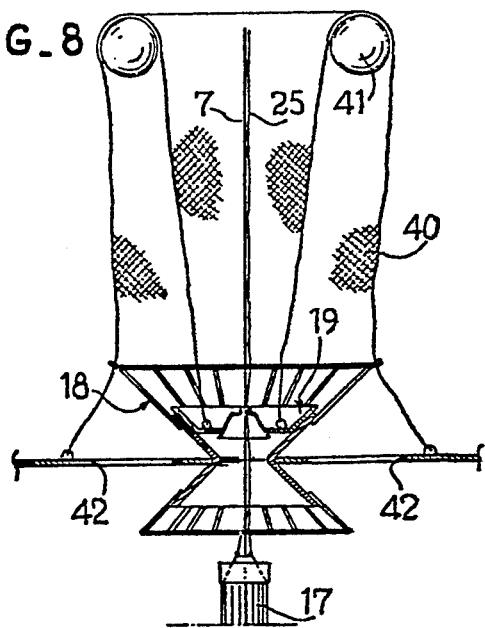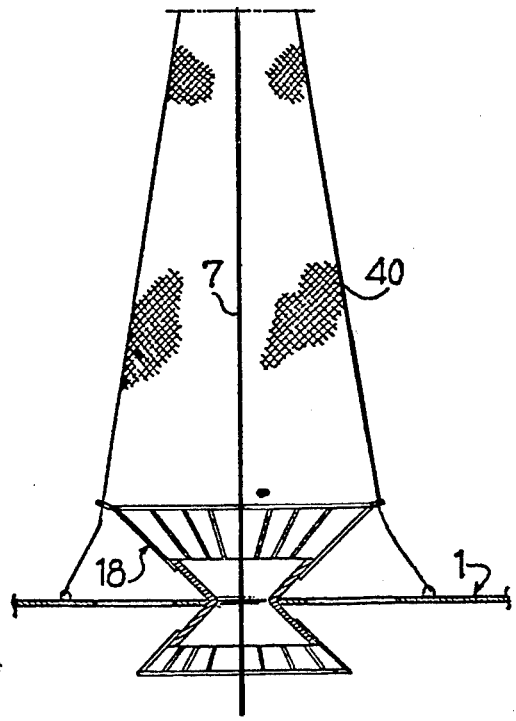

FISH BREEDING CAGE STRUCTURE

The present invention relates to fish breeding cages in which the fishes, such as alevins, are maintained and fed until they have the required size, for example for setting them free.

Cages of this type are known which are disposed on the surface of a basin, or the sea or a river or an estuary, with for example an anchoring to a pontoon, but they are in this case subject to various risks related to their position on the surface.

Other cages of this type are known which are let down to the bottom of the sea or a river and usually anchored, but they then create considerable obligations requiring the work of specialized divers, in particular when placing the cage in position and, above all, when regularly renewing the food required by the fish.

An object of the present invention is to avoid these requirements. According to the invention, there is provided a fish breeding cage of the type intended to be maintained at depth in water, wherein there is provided an opening formed in its upper face and cooperating with a closing device allows the passage of only a feeding means which is movably mounted on guide means extending from inside the cage up to the surface of the water and provided with means for driving it along said guide means.

In this way it is possible to fill the feeding means with food on the very surface of the water, this means thereafter redescending to inside the cage, along the guide means and through the closing device, so as to stay in the cage until a new filling is required, the closing device moreover preventing the fish from escaping.

In a particularly advantageous manner, the closing device comprises a closure means normally closing said opening and capable of moving away from the closing position upon the upward passage of the feeding means through the opening and returning to this position upon its downward passage, and means for isolating from the exterior at least the volume of the cage after the upward passage of the feeding means through the opening.

The closure means is preferably constituted by a member disposed above the opening and having a negative floatability (that is to say its density is higher than that of the surrounding water). In this way this closure means is automatically put into the closing position with no requirement for a return means.

The feeding means is moreover advantageously provided with an upper bearing part disposed in such manner as to be capable of urging the closure means away from its closing position. In this way the closure means is also put automatically into the opening position with no actuating means other than the utilization of the upward displacement of the feeding means.

Also, it is preferably arranged to associate with the closure means a seat against which it can bear vertically, this closure means being also movably mounted on the guide means of the feeding means so that no other particular guide means is required therefor.

As concerns the isolating means, in a first specific embodiment of the invention, it comprises a closure means which normally leaves said opening free and is capable of moving to the position for closing the opening upon the upward passage of the feeding means through the opening and moving away from this position upon its downward passage. This arrangement ensures a perfect symmetry of the opening and closing movements and enables the cage to be completely isolated when the feeding means is in the upper position.

Although the two closure means may be constituted by a single member performing successively the opening function and closing function before and after the passage of the feeding means, these two closing means are preferably constituted by two separate members.

Moreover it may be advantageously arranged that the second closure means have arrangements which are similar to or at least symmetrical with those which may be provided for the first closure means with the same advantages. Thus, whether the two means be made from a single or two members, the feeding means may also be provided with a lower bearing part disposed in such manner as to be capable of urging the second closing means from its closing position, which automatically places it in its opening position by the simple downward displacement of the feeding means. Likewise, when they are constituted by two separate elements, the second may be disposed below the opening and have a positive floatability which enables it to be automatically put into the closing position. In this case also, a seat may be associated therewith against which seat it may engage vertically, this means being also movably mounted on the guide means of the feeding means.

In another specific embodiment of the invention, the isolating means comprises a flexible wall, such as a net, which constitutes, with the opening of the cage and the closure means, a fully closed enclosure so that the assembly comprising the cage and this enclosure may be isolated when the feeding means is in the upper position, the fish being in this way unable to escape from this assembly.

Advantageously, the feeding means has a negative floatability so that its descending movement is rendered automatic while it is provided with a cable for raising it along guide means.

The latter are themselves preferably constituted by a cable stretched between the bottom of the cage and a surface float and along which the feeding means and possibly the or each closure means are slidable.

Moreover, there may be advantageously provided in the bottom of the cage an orifice communicating with a chamber adapted to receive a predatory of the bred species so as to permit eliminating any dead fish.

The cage is preferably placed on a base let down to the bottom of the water and guide means are provided for the cage between this base and the surface so as to enable it to be placed in position and extracted.

Further features and advantages of the invention will be apparent from the ensuing description of non-limitative embodiments with reference to the accompanying drawings in which:

FIG. 1 is a diagrammatic elevational view of a cage according to a first embodiment of the invention;

FIG. 2 is a top view of the cage proper and FIG. 3 a top view of its base;

FIG. 4 is a partial sectional view, to an enlarged scale, of the opening of the cage, of the feeding means and of the two closure means, shown to be shifted apart from each other in order to render the drawing more clear;

FIGS. 5 and 6 are elevational and top views, to an enlarged scale, of the eliminating chamber of the cage;

FIG. 7 is a view similar to FIG. 1, but in which the feeding means is brought to the surface, whereas FIG. 1 shows it in its normal feeding position;

FIG. 8 is a partial elevational view of a cage according to a second embodiment of the invention, in the normal feeding position;

FIG. 9 is a similar view of this cage, in the raised position of the feeding means.

The cage shown in FIGS. 1 to 7 comprises a cage proper 1 placed on a base 2 which is let down to the bottom of the sea 3.

The cage proper 1 has the shape of a double truncated pryamid having a common square large base and it consists of a stainless steel rod frame 4 having good strength and good resistance to corrosion, this frame carrying a net 5 of metal or plastics material having small meshes, the dimension of which is a function of the species to be bred. At the level of the small base of the lower inverted truncated pyramid, the frame is constituted by a cross-strut 6 in the centre of which the lower end of a vertical cable 7 is fixed, this cable extending, through a central circular opening 8 formed in the upper surface, or small base, of the upper truncated pyramid of the cage, up to the surface 9 of the sea where its upper end is secured to a float 10. Below the level of the cross-strut 6, the frame 4 and the net 5 are extended by a second inverted truncated pyramid on the small base of which there is disposed a predator chamber 11 which will be described in more detail hereinafter.

The base 2 is constituted by four concrete posts 12 which are interconnected by horizontal ties 13 and are anchored to the bottom either under the effect of their own weight or by, for example, sea anchors. The cage 1 bears by the small base of its lower truncated pyramid on the inner upper corners of the posts 12, and it has rings 14 at the four corners of its large base which are slidable on four cables 15 secured at their lower end to the posts 12 and at their upper end to floats 16 located on the surface of the sea. It will be clear that in hauling on the cable 7 from the surface, it is possible to raise the cage 1 up to the surface, the cage being guided in this movement along the substantially vertical cables 15. FIG. 1 shows the cage in dot-dash lines in a position near to the surface.

The cage is moreover provided with a feeding means 17 and a device for closing the opening 8 which is constituted by a seat 18 and two valve members or closure means 19 and 20.

The feeding means 17 is constituted by a vertical apertured cylinder formed by bars 21 and closed in its upper part and lower part by two frustoconical heads 22 and 23 which converge respectively upwardly and downwardly, the small bases thereof being interconnected by a central tube 24 which extends throughout the cylinder and is slidably mounted on the cable 7. The diameter of the cylinder is practically equal to the diameter of the opening 8 so that it is capable of passing upwardly therethrough with a small clearance, and a handling line or cord 25 is provided and secured by rings to the upper head 22 and extends up to the float 10 so as to permit raising the cylinder up to the latter.

The seat 18 is constituted by two frustoconical portions which are disposed one above and the other below, the opening 8 and are both convergent toward the latter. These portions have, one at its base and the other at its top, seats proper 26 and 27 consisting of perforated sheets which permit the passage of currents of water, whereas the remainder of these portions simply consists of a frame of stainless steel rod whose purpose is merely to limit possible transverse displacements of the valve members 19 and 20.

The upper valve member 19 has an outer cup 28 whose wall is frustoconical and upwardly divergent with the same inclination as the upper perforated sheet seat 26 and whose bottom has extending therethrough, in the middle, an inner cup 29 which is frustoconical and downwardly divergent and has the same inclination as the upper head 22 of the feeding means 17, whereas its end has an orifice 30 through which the cable 7 and the line 25 extend. In a similar manner, the lower valve member 20 comprises an outer cup 31 whose wall is frusto-conical and upwardly convergent with the same inclination as the lower seat 27 of perforated sheet and whose bottom has extending therethrough, in the middle, an inner cup 32 whose frustoconical wall is upwardly divergent and has the same inclination as the lower head 23 of the feeding means whereas its end has an orifice 33 through which the cable 7 extends. The annular space between the two cups is filled with a cellular material such as plastics foam 34 which imparts thereto a positive floatability but this material leaves a free passage around the inner cup 32 for a cylindrical skirt 35 which surrounds the lower head 23 of the feeding means 17 and whose diameter is slightly larger than the diameter of the large base of this inner cup 32. This arrangement allows this skirt to fit around the inner cup of the valve member and thereby ensures good stability of the assembly when the feeding means 17 bears on the valve member as will be described hereinafter. For the same purpose, there is also provided another cylindrical skirt 36 which surrounds the upper head 22 of the feeding means and is capable of fitting around the part of the inner cup 29 of the upper valve member which projects below its outer cup.

The feeding means or cylinder 17 and the two valve members 19 and 20 are threaded on the cable 7 by the tube 24 and the orifices 30 and 33, the cylinder 17 being disposed between the two valve members.

As shown in FIGS. 5 and 6, the eliminating chamber 11 consists of a box of perforated sheet which has a rectangular-sided shape except for its upper face 37 which has the shape of a square-based inverted truncated pyramid, its small base being constituted by an orifice 38 whose width is sufficient to allow the passage of a fish belonging to the species bred in the cage but insufficient to allow the passage of a fish 39 which is a predator of this species and is enclosed in this chamber.

The cage just described is used in the following manner:

The feeding cylinder 17 filled with food constituted by granular products, pieces of fresh food or a paste, is lowered by means of the line 25 and under the effect of its own weight, down to the opening 8 of the cage through which it slides then, after fitting onto the lower valve member 20, urges the latter in a direction to place the assembly on the cross-strut 6 of the cage, while the upper valve member 19 applies itself under the effect of its own weight on the upper seat 26. This position, shown in FIG. 1, is the normal feeding position in which the fish take the food contained in the cylinder 17 and cannot escape from the cage owing to the presence of the valve member 19. If during this period of feeding some fish die, they slip toward the orifice 38 and into the chamber 11 where they are eliminated by the fish 39. In order to renew the food in the cylinder 17, the latter is raised also by means of the line 25, the cylinder leaving the cage by way of the opening 8 by raising the valve member 19 until it reaches the surface of the water, while the lower valve member 20 arrives immediately therebehind and applies itself against the lower seat 27. In this position, shown in FIG. 7, the fish cannot leave the cage 1 owing to the presence of the valve member 20.

The cage shown in FIGS. 8 and 9 has on the whole the same structure and the same arrangement as that of FIGS. 1 to 7 except that there is no lower valve member 20 provided therein and that, for the purpose of performing the cage isolating function when the feeding cylinder 17 is in the upper position which was performed by this valve member 20, there is provided a roughly tubular-shaped net 40 whose lower opening is fixed in succession on the upper face of the cage around the seat 18 and on the large base of the frame of this seat, whereas its other end is fixed to the outer cup of the valve member 19. In the feeding position shown in FIG. 8, in which position the valve member 19 bears under the effect of its weight on the seat 18, the tubular net is folded inwardly in the middle around floats 41 which are freely disposed inside this net so that the other end of the net is located with the valve member 19 at the level of its end fixed to the cage. On the other hand, in the position for raising the feeding cylinder 17 shown in FIG. 9, the upper half of the net is raised with the valve member 19 and the cylinder 17, the floats 41, which are not secured to the net, also being raised up to the upper end of the latter. Thus, in this position, the net 40 defines an enclosure which constitutes with the cage a fully isolated assembly from which the fish cannot escape. The valve member 19 operates in cooperation with the cylinder 17 in the same way as in the first embodiment. The upper face of the cage moreover has passages 42, formed in the latter between the attachment of the net 40 and the seat 18, to enable fish trapped inside this net 40, when closing the valve member 19, to return to the inside of the cage proper.

In a modification, the eliminating chamber 11 may have a shape of a downwardly convergent truncated pyramid with a square base, and the upper face 37 of FIG. 5 may be replaced by a pyramid which is supported in the centre thereof above the bottom of the chamber and whose apex extends upwardly, whereas its base defines therebetween and the contour of the chamber a passage the width of which has a value similar to that of the orifice 38 of FIG. 5.

Having now described my invention what I claim as new and desire to secure by Letters Patent is:

1. A fish breeding cage structure comprising a cage, means for retaining said cage entirely below the surface of the water, said cage having an upper portion, means defining an opening in said upper portion, guide means extending from inside said cage to the surface of the water, a feeding means movably mounted on said guide means for moving between the surface and the inside of said cage for supplying food to fish inside said cage, means for moving said feeding means along said guide means, a closing device for closing said opening when said feeding means is located within said cage, and said feeding means moving said closing device when said feeding means is raised.

2. A fish breeding cage structure as claimed in claim 1, wherein said feeding means has a negative floatability and includes a line for raising it along said guide means.

3. A fish breeding cage structure as claimed in claim 1, including a chamber at the bottom of said cage for receiving a predator and means defining an orifice putting the interior of said cage in communication with said chamber for eliminating dead fish from the interior of said cage.

4. A fish breeding cage structure as claimed in claim 1, including a base located at the bottom of the water and means for guiding said cage onto said base.

5. A fish breeding cage structure as claimed in claim 1, wherein said guide means includes a float for floating on the surface of the water and a cable attached to said cage in a region adjacent the bottom thereof, said feeding means being slidable along said cable.

6. A fish breeding cage structure as claimed in claim 5, wherein said closure device is slidable along said cable.

7. A fish breeding cage structure comprising a cage, means for retaining said cage entirely below the surface of the water, said cage having an upper portion, means defining an opening in said upper portion, guide means extending from inside said cage to the surface of the water, a feeding means movably mounted on said guide means for moving between the surface of the water and the inside of said cage for supplying food to fish inside said cage, means for moving said feeding means along said guide means, a closing device for closing said opening when said feeding means is located within said cage, said closing device including a first closure means normally occupying a position for closing said opening, and said feeding means moving said closure means away from closing position upon an upward passage of said feeding means through the opening and returning said closure means to a closing position upon a downward passage of said feeding means through said opening.

8. A fish breeding cage structure as claimed in claim 7, wherein said closing device includes a flexible wall which constitutes in combination with said opening of said cage and said first closure means a completely closed enclosure.

9. A fish breeding cage structure as claimed in claim 7, wherein said first closure means includes a member which is disposed above said opening and has negative floatability.

10. A fish breeding cage structure as claimed in claim 7, wherein said feeding means includes an upper bearing portion for engaging and urging said first closure means away from said closing position in said upward movement of said feeding means.

11. A fish breeding cage structure as claimed in claim 7, including a seat mounted on said cage, said first closure means being movably mounted on said guide means of said feeding means and bearing against said seat in said closing position.

12. A fish breeding cage structure as claimed in claim 7, wherein said closing device includes a second closure means which is normally spaced from said opening and capable of moving into a position for closing said opening upon the upward passage of said feeding means through said opening and moving away from said closing position upon the downward passage of said feeding means.

13. A fish breeding cage structure as claimed in claim 12, wherein said first and second closure means are two separate elements.

14. A fish breeding cage structure as claimed in claim 12, wherein said second closure means includes a member which is disposed below said opening and has positive floatability.

15. A fish breeding cage structure as claimed in claim 12, wherein said feeding means includes a lower bearing portion for engaging and urging said second closure means away from said closing position in said downward movement of said feeding means.

16. A fish breeding cage structure as claimed in claim 12, including a seat mounted on said cage, said second closure means being movably mounted on said guide means of said feeding means and bearing against said seat in said closing position.

* * * * *